(12) United States Patent
Glöckner et al.

(10) Patent No.: US 7,005,002 B2
(45) Date of Patent: Feb. 28, 2006

(54) BRANCHED, AMORPHOUS, POLYESTER-BASED MACROPOLYOLS OF NARROW MOLECULAR WEIGHT DISTRIBUTION

(75) Inventors: Patrick Glöckner, Ratingen (DE); Giselher Franzmann, Witten (DE); Martin Schmitthenner, Wetter (DE)

(73) Assignee: Degussa AG, Duesseldorf (DE)

( * ) Notice: Subject to any disclaimer, the term of this patent is extended or adjusted under 35 U.S.C. 154(b) by 92 days.

(21) Appl. No.: 10/838,238

(22) Filed: May 5, 2004

(65) Prior Publication Data
US 2004/0236033 A1  Nov. 25, 2004

(30) Foreign Application Priority Data
May 19, 2003  (DE) ................ 103 22 845

(51) Int. Cl.
*C09D 11/00* (2006.01)
*C08G 63/00* (2006.01)
*C08F 20/00* (2006.01)

(52) U.S. Cl. ............... 106/31.13; 528/302; 528/307; 528/308; 528/308.6; 525/437; 525/440; 525/443; 106/31.6; 106/440

(58) Field of Classification Search ............ 528/302, 528/307, 308, 308.6; 525/437, 440, 443; 106/31.13, 31.6, 440
See application file for complete search history.

(56) References Cited

U.S. PATENT DOCUMENTS 4,410,668 A * 10/1983 Piccirilli et al. ............ 525/440

FOREIGN PATENT DOCUMENTS

| DE | 197 07 733 | 11/1997 |
|---|---|---|
| EP | 0 705 858 | 4/1996 |

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

Branched, amorphous, polyester-based macropolyols having a narrow molecular weight distribution and a process for making the macropolyol.

31 Claims, No Drawings

BRANCHED, AMORPHOUS, POLYESTER-BASED MACROPOLYOLS OF NARROW MOLECULAR WEIGHT DISTRIBUTION

BACKGROUND OF THE INVENTION

1. Field of the Invention

The invention relates to branched, amorphous, polyester-based macropolyols having a narrow molecular weight distribution and a process for making the macropolyol.

2. Description of the Related Art

Saturated polyester resins are known and are conventionally prepared by condensing saturated dicarboxylic acids, their anhydrides or other esterifiable derivatives with diols. Their properties depend largely on the nature and proportion of the starting materials.

Branched, polyester-based macropolyols are described, for example, in DE 196 49 394. These materials are prepared from a defined selection of raw materials and have relatively high OH numbers of from 80 to 300 mg KOH/g, and acid numbers of from 5 to 30 mg KOH/g.

Polyester molecules with high OH numbers and high acid numbers may not possess the functionality and/or high molecular weight desirable in polymer resins. One resulting disadvantage is that a higher proportion of crosslinker is needed and higher costs may result when isocyanates are used as crosslinker molecules. High acid number may also have other disadvantageous consequences since as a result of the hydrophilic centers (carboxyl groups) the water resistance of, for example, coatings, can be adversely affected.

US 2002026028 discloses polyesterpolyols having a similar structure with similar disadvantages.

SUMMARY OF THE INVENTION

Accordingly, it is an object of the present invention to prepare amorphous macropolyols having a high functionality and at the same time having low viscosity and polydispersity.

It was surprising found that polymers based on a cycloaliphatic 1,2-dicarboxylic acid and/or derivatives thereof such as an anhydride, for example, and at least one trifunctional alcohol component gives macropolyols having high functionality, a high degree of branching and, at the same time, low viscosity and polydispersity.

DETAILED DESCRIPTION OF THE PREFERRED EMBODIMENTS

The invention provides branched, amorphous polyester-based macropolyols having a narrow molecular weight distribution, synthesized from A) at least one dicarboxylic acid component comprising
1) at least 85 mol % of at least one cycloaliphatic 1,2-dicarboxylic acid and/or anhydride and/or ester, and
2) not more than 15 mol % of at least one further dicarboxylic acid and/or anhydride and/or ester, and B) at least one alcohol component comprising
1) from 5 to 30 mol % of at least one at least trifunctional alcohol, and
2) from 70 to 95 mol % of at least one further diol.

The macropolyols have:
a functionality of from 3.5 to 10.0, preferably from 3.5 to 8.0, more preferably from 4.0 to 6.0, an $M_n$ of from 2,000 to 10,000 g/mol, preferably from 2,000 to 7,000 g/mol, more preferably from 2500 to 4000, an $M_w$ of from 8,000 to 60,000 g/mol, preferably from 8,000 to 40,000 g/mol, more preferably from 8000 to 20,000, a polydispersity of from 2.5 to 30, preferably 3–25, more preferably from 3 to 15, an OH number of from 0 to 150 mg KOH/g, preferably from 30 to 80 mg KOH/g, more preferably from 40 to 60 mg KOH/g, an acid number of from 0 to 4.9 mg KOH/g, preferably 0–3.0 mg KOH/g, more preferably 0–1.5, and a dynamic viscosity of the resin, at 65% in Solvesso® 150/butyl glycol (3:1), of from 1,000 to 20 000 mPa·s, preferably from 1000 to 15 000 mPa·s, more preferably from 1,000 to 10,000 mPa·s.

The amorphous, branched, polyester-based macropolyols of the invention have a narrow molecular weight distribution and are prepared from a starting acid component that includes at least one cycloaliphatic 1,2-dicarboxylic acid such as, for example, 1,2-cyclohexanedicarboxylic acid and/or methyltetrahydro, tetrahydro and/or methylhexahydrophthalic acid (anhydride) and/or derivatives thereof such as the anhydride thereof, in amounts of at least 85 mol %, preferably 100 mol %, based on the dicarboxylic acid component.

It is also possible for aromatic and/or aliphatic and/or cycloaliphatic monocarboxylic acids and/or dicarboxylic acids and/or polycarboxylic acids to also be present in the macropolyol, such as, for example, phthalic acid, isophthalic acid, terephthalic acid, 1,3-cyclohexanedicarboxylic acid, 1,4 cyclohexanedicarboxylic acid, succinic acid, sebacic acid, dodecanedioic acid, adipic acid, azelaic acid, pyromellitic acid and/or trimellitic acid, isononanoic acid, and 2 ethylhexanoic acid. Preference is given to using isophthalic acid, phthalic acid, succinic acid, sebacic acid, adipic acid and/or azelaic acid, in amounts of not more than 15 mol %, based on the dicarboxylic acid component.

Each acid component can be composed in whole or in part of anhydrides and/or low molecular weight alkyl esters, preferably methyl esters and/or ethyl esters.

The at least trifunctional alcohol component may be, for example, trimethylolpropane, trimethylolethane, 1,2,6-trihydroxyhexaerythritol, glycerol, tris-hydroxyethyl isocyanurate, pentaerythritol, sorbitol, xylitol and/or mannitol, present in amounts of from 5 to 30 mol %, preferably from 5 to 20 mol %, based on the alcohol component.

The alcohol component may additionally comprise further linear and/or branched, aliphatic and/or cycloaliphatic and/or aromatic diols and/or polyols, such as, for example, ethylene glycol, 1,2- and/or 1,3-propanediol, diethylene, dipropylene, triethylene, and tetraethylene glycol, 1,2- and/or 1,4 butanediol, 1,3 butylethylpropanediol, 1,3-methylpropanediol, 1,5-pentanediol, bisphenol A, B, C, F, norbornylene glycol, 1,4-benzyldimethanol and ethanol, 2,4-dimethyl-2-ethylhexane-1,3-diol, cyclohexanedimethanol, Dicidol, hexanediol, and neopentyl glycol, present in amounts of from 70 to 95 mol %, preferably from 80 to 95 mol %, based on the alcohol component.

The alcohol component is generally present in a molar ratio of from 0.8 to 2.0:1 with respect to the acid component, preferably from 0.8 to 1.5:1. With particular preference the reaction of the alcohol component takes place in a molar ratio of from 1.0 to 1.3:1 with respect to the acid component.

The saturated, amorphous macropolyols of the invention can have an acid number of less than 5.0 mg KOH/g, preferably less than 3.0, more preferably between 0 and 1.5 mg KOH/g and an OH number of between 0 and 150 mg KOH/g, preferably between 30 and 80, more preferably between 40 and 60 mg KOH/g.

The use of from 5 to 30 mol % of at least one at least trifunctional alcohol in the chosen alcohol component results in a polymer functionality of from 3.5 to 10.0, preferably from 3.5 to 8.0, more preferably from 4.0 to 6.0.

The resultant number-average molecular weights $M_n$ are from 2,000 to 10,000 g/mol, preferably from 2,000 to 7,000, more preferably from 2,500 to 4,000, and the resultant weight-average molecular weights $M_w$ are from 8,000 to 60,000 g/mol, preferably from 8,000 to 40,000, more preferably from 8,000 to 20,000.

Despite having high functionality the amorphous macropolyols of the invention have a polydispersity of between 2.5 and 30, preferably 3.0–25, more preferably from 3.0 to 15, giving a dynamic viscosity of from 1,000 to 20,000, preferably from 1,000 to 15,000, more preferably from 1,000 to 10,000 mPa·s (23° C., 65% in Solvesso® 150/butyl glycol (3:1)).

The branched, amorphous, polyester-based macropolyols of the invention having a narrow molecular weight distribution may further comprise auxiliaries and additives selected from inhibitors, water and/or organic solvents, neutralizing agents, surface-active substances, oxygen scavengers and/or free-radical scavengers, catalysts, light stabilizers, color brighteners, photosensitizers, thixotropic agents, antiskinning agents, defoamers, antistats, thickeners, thermoplastic additives, dyes, pigments, flame retardants, internal release agents, fillers and/or blowing agents.

The invention also provides a process for preparing branched, amorphous, polyester-based macropolyols having a narrow molecular weight distribution by reacting A) at least one dicarboxylic acid component comprising
  1) at least 85 mol % of at least one cycloaliphatic 1,2-dicarboxylic acid and/or anhydride and/or ester, and
  2) not more than 15 mol % of at least one further dicarboxylic acid and/or anhydride and/or ester, and
B) at least one alcohol component comprising
  1) from 5 to 30 mol % of at least one at least trifunctional alcohol, and
  2) from 70 to 95 mol % of at least one further diol, to form a polyol having, for example,
  a functionality of from 3.5 to 10.0,
  an $M_n$ of from 2,000 to 10,000 g/mol,
  an $M_w$ of from 8,000 to 60,000 g/mol,
  a polydispersity of from 2.5 to 30,
  an OH number of from 0 to 150 mg KOH/g,
  an acid number of from 0 to 4.9 mg KOH/g, and
  a dynamic viscosity of the resin, at 65% in Solvesso® 150/butyl glycol (3:1), of from 1,000 to 20,000 mPa·s.

The amorphous, branched, polyester-based macropolyols of the invention having a narrow molecular weight distribution are obtained by reacting the alcohol component and the acid component.

Preparation of the branched, amorphous, polyester-based macropolyols of the invention having a narrow molecular weight distribution may be carried out by (semi)continuous or batchwise esterification of the starting acids and starting alcohols in a single-stage or multistage procedure.

The process of the invention is preferably conducted in an inert gas atmosphere at from 150 to 270° C., more preferably from 160 to 230° C., very preferably from 160 to 210° C. Nitrogen or noble gases can be used as the inert gas, especially nitrogen. The inert gas has an oxygen content of less than 50 ppm, in particular less than 20 ppm.

The macropolyols of the invention find use as a main component, base component or additional component in coating compositions, printing inks, pigment pastes, tinting pastes, masterbatches, ballpoint pastes, graphics inks, polishes, adhesives, sealants, and insulants, and in particular as a main component, base component or additional component in coating compositions, printing inks, pigment pastes, tinting pastes, masterbatches, ballpoint pastes, graphics inks, polishes, adhesives, sealants, and insulants comprising isocyanates and isocyanate derivatives and/or amine resins as crosslinkers.

The amorphous, branched, polyester-based macropolyols of the invention having a narrow molecular weight distribution are illustrated by the following example which is not intended to further limit the invention.

EXAMPLE 1

| mol % | % by weight | Ingredient |
| --- | --- | --- |
| Acid component | | |
| 100 | 59.9 | 1,2-Cyclohexanedicarboxylic anhydride |
| 100 | | Total acid component |
| Alcohol component | | |
| 30 | 7.5 | Neopentyl glycol |
| 39 | 10.3 | Monoethylene glycol |
| 15 | 13.2 | 1,6-Hexanediol |
| 16 | 9.1 | Trimethylolpropane |
| 100 | | Total alcohol component |

59.9 parts of 1,2-cyclohexanedicarboxylic acid was reacted with 7.5 parts of neopentyl glycol, 10.3 parts of monoethylene glycol, 13.2 parts of 1,6-hexanediol and 9.1 parts of trimethylolpropane at a maximum temperature of 250° C. in a nitrogen atmosphere until an acid number below 1 mg KOH/g was reached. After cooling, the polyester was dissolved at 65% in Solvesso 150/butyl glycol (3:1). Solvesso® 150 is a mixture of aromatic hydrocarbons having an aromatic content of at least 98 volume % and a distillation of about 180 to 207° C.

Key analytical data:

OHN=55 mg KOH·g$^{-1}$, AN=0.4 mg KOH·g$^{-1}$, OH functionality=8.15

Tg=13° C.

$M_n$=3600 g·mol$^{-1}$, $M_w$=50 000 g·mol$^{-1}$, $M_w/M_n$=13.9 g·mol$^{-1}$, dyn. viscosity, 23° C., 65% in Solvesso® 150/butyl glycol (3:1)=8000 mPas

COMPARATIVE EXAMPLE A

The polyester from example 1 was repeated with 1,4- instead of 1,2-cyclohexanedicarboxylic acid in the acid component.

Despite the much higher OH number of 67 mg KOH/g the dynamic viscosity and polydispersity were significantly higher. In addition, insoluble, i.e., gelled, fractions were found, so that the key analytical data could only be estimated.

Key analytical data:
OHN=67 mg KOH·g$^{-1}$, AN=3.0 mg KOH·g$^{-1}$, OH functionality=4.3
Tg=−1° C.
$M_n$=~4000 g·mol$^{-1}$, $M_w$=~44,000 g·mol$^{-1}$, $M_w/M_n$=>11 g·mol$^{-1}$,
dyn. viscosity, 23° C., 65% in Solvesso® 150/butyl glycol (3:1)=~10,000 mPas German application 10322845.4 filed on May 19, 2003 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A branched macropolyol comprising reacted units of
   A) at least one dicarboxylic acid component comprising
      1) at least 85 mol % of at least one of a cycloaliphatic 1,2-dicarboxylic acid, an anhydride thereof or an ester thereof, and
      2) not more than 15 mol % of at least one of a further dicarboxylic acid, an anhydride thereof or an ester thereof; and
   B) at least one alcohol component comprising
      1) from 5 to 30 mol % of at least one at least trifunctional alcohol, and
      2) from 70 to 95 mol % of at least one further diol,
   wherein the branched macropolyol has
   a functionality of from 3.5 to 10.0,
   an $M_n$ of from 2,000 to 10,000 g/mol,
   an $M_w$ of from 8,000 to 60,000 g/mol,
   a polydispersity of from 2.5 to 30,
   an OH number of from 0 to 150 mg KOH/g,
   an acid number of from 0 to 4.9 mg KOH/g, and
   a dynamic viscosity at 65% in a 3:1 mixture of aromatic hydrocarbons having a distillation range of 180 to 207° C. and butyl glycol of from 1,000 to 20,000 mPa·s.

2. The macropolyol as claimed in claim 1, wherein
   the functionality is from 3.5 to 8.0,
   the $M_n$ is from 2000 to 7000 g/mol,
   the $M_w$ is from 8000 to 40 000 g/mol,
   the polydispersity is from 3 to 25,
   the OH number is from 30 to 80 mg KOH/g,
   the acid number is from 0 to 3.0 mg KOH/g, and
   the dynamic viscosity is from 1,000 to 15,000 mPa·s.

3. The macropolyol as claimed in claim 2, wherein
   the functionality is from 4.0 to 6.0,
   the $M_n$ is from 2,500 to 4,000 g/mol,
   the $M_w$ is from 8,000 to 20,000 g/mol,
   the polydispersity is from 3.0 to 15,
   the OH number is from 40 to 60 mg KOH/g,
   the acid number is from 0 to 1.5 mg KOH/g, and
   the dynamic viscosity is from 1,000 to 10,000 mPa·s.

4. The macropolyol as claimed in claim 1, wherein the acid number is from 0 to 3.0 mg KOH/g.

5. The macropolyol as claimed in claim 1, wherein the OH number is from 30 to 80 mg KOH/g.

6. The macropolyol as claimed in claim 1, wherein the $M_n$ is from 2,000 to 7,000 g/mol and the $M_w$ is from 8,000 to 40,000 g/mol.

7. The macropolyol as claimed in claim 1, wherein the functionality is from 3.5 to 8.0.

8. The macropolyol as claimed in claim 1, wherein the polydispersity is from 3 to 25.

9. The macropolyol as claimed in claim 1, wherein the dicarboxylic acid component comprises one or more of 1,2-cyclohexanedicarboxylic acid, methyltetrahydrophthalic acid, tetrahydrophthalic acid, methylhexahydrophthalic acid, an anhydride thereof or a derivative thereof.

10. The macropolyol as claimed in claim 1, wherein the dicarboxylic acid component comprises at least one of 1,2-cyclohexanedicarboxylic acid or a derivative thereof.

11. The macropolyol as claimed in claim 1, wherein the further dicarboxylic acid is one or more of an aromatic acid, an aliphatic acid, a cycloaliphatic monocarboxylic acid, a dicarboxylic acid, a polycarboxylic acid or a derivative thereof.

12. The macropolyol as claimed in claim 1, wherein the further dicarboxylic acid is at least one of phthalic acid, isophthalic acid, terephthalic acid, 1,3-cyclohexanedicarboxylic acid, 1,4-cyclohexanedicarboxylic acid, succinic acid, sebacic acid, dodecanedioic acid, adipic acid, azelaic acid, pyromellitic acid, trimellitic acid, isononanoic acid, 2-ethylhexanoic acid or a derivative thereof.

13. The macropolyol as claimed in claim 1, wherein the dicarboxylic acid component comprises one or more anhydrides or low molecular weight alkyl esters.

14. The macropolyol as claimed in claim 1, wherein the alcohol component comprises at least one of trimethylolpropane, trimethylolethane, 1,2,6-trihydroxyhexaerythritol, glycerol, tris-hydroxyethyl isocyanurate, pentaerythritol, sorbitol, xylitol or mannitol.

15. The macropolyol as claimed in claim 1, wherein the alcohol component comprises at least one of trimethylolpropane, trimethylolethane, or tris-hydroxyethyl isocyanurate.

16. The macropolyol as claimed in claim 1, wherein the alcohol component comprises one or more of a further aliphatic, cycloaliphatic, or aromatic diol or polyol.

17. The macropolyol as claimed in claim 1, wherein the alcohol component comprises one or more of ethylene glycol, 1,2-propanediol, 1,3-propanediol, diethylene, dipropylene, triethylene alcohol, tetraethylene glycol, 1,2-butanediol, 1,4-butanediol, 1,3-butylethylpropanediol, 1,3-methylpropanediol, 1,5-pentanediol, bisphenol A, bisphenol B, bisphenol C, bisphenol F, norbornylene glycol, 1,4-benzyldimethanol,1,4-benzyldidimethyl-2-ethylhexane-1,3-diol, cyclohexanedimethanol, Dicidol, hexanediol or neopentyl glycol.

18. The macropolyol as claimed in claim 1, wherein the acid number is from 0 to 1.5 mgKOH/g.

19. The macropolyol as claimed in claim 1, wherein the OH number is from 40 to 60 mgKOH/g.

20. The macropolyol as claimed in claim 1, wherein the $M_n$ is from 2,500 to 4,000 g/mol, and an $M_w$ of from 8,000 to 20,000 g/mol.

21. The macropolyol as claimed in claim 1, wherein the functionality is from 4.0 to 6.0.

22. The macropolyol as claimed in claim 1, wherein the polydispersity is from 3 to 15.

23. The macropolyol as claimed in claim 1, wherein the dicarboxylic acid component comprises one or more of a methylester or an ethylester of a dicarboxylic acid.

24. A process for preparing a branched, amorphous, macropolyol comprising: reacting
   A) at least one dicarboxylic acid component comprising
      1) at least 85 mol % of at least one of a cycloaliphatic 1,2-dicarboxylic acid, an anhydride or an ester thereof; and
      2) not more than 15 mol % of at least one of a further dicarboxylic acid, an anhydride thereof or ester thereof; and B) at least one alcohol component comprising
1) from 5 to 30 mol % of at least one at least trifunctional alcohol, and
2) from 70 to 95 mol % of at least one further diol, to form a macropolyol having
a functionality of from 3.5 to 10.0,
an $M_n$ of from 2,000 to 10,000 g/mol,
an $M_w$ of from 8,000 to 60,000 g/mol,
a polydispersity of from 2.5 to 30,
an OH number of from 0 to 150 mg KOH/g,
an acid number of from 0 to 4.9 mg KOH/g, and
a dynamic viscosity at 65% in a 3:1 mixture of aromatic hydrocarbons having a distillation range of 180 to 207° C. and butyl glycol of from 1,000 to 20,000 mPa·s.

25. A macropolyol obtained by the process as claimed in claim 24.

26. A composition comprising the macropolyol as claimed in claim 1.

27. The composition as claimed in claim 26, further comprising at least one of an isocyanate, an isocyanate derivative, or an amine resin.

28. A cured composition comprising the macropolyol as claimed in claim 1 and reacted units of a crosslinker.

29. The cured composition as claimed in claim 28, wherein the crosslinker is at least one of an isocyanate, an isocyanate derivative, or an amine resin.

30. The composition as claimed in claim 26, selected from the group consisting of a coating composition, a printing ink, a pigment paste, a tinting paste, a masterbatch, a ballpoint paste, a graphics ink, a polish, an adhesive, a sealant, and an insulant.

31. The composition as claimed in claim 30, further comprising at least one crosslinker selected from the group consisting of an isocyanate, an isocyanate derivative and an amine resin.

* * * * *